(12) United States Patent
Khan

(10) Patent No.: US 10,189,919 B2
(45) Date of Patent: Jan. 29, 2019

(54) ACETALIZED POLYVINYL ALCOHOL BARRIER COATINGS

(71) Applicant: SUN CHEMICAL CORPORATION, Parsippany, NJ (US)

(72) Inventor: Safraz Khan, South Croydon (GB)

(73) Assignee: SUN CHEMICAL CORPORATION, Parsippany, NJ (US)

( * ) Notice: Subject to any disclaimer, the term of this patent is extended or adjusted under 35 U.S.C. 154(b) by 206 days.

(21) Appl. No.: 14/784,507

(22) PCT Filed: May 15, 2014

(86) PCT No.: PCT/US2014/038142
§ 371 (c)(1),
(2) Date: Oct. 14, 2015

(87) PCT Pub. No.: WO2014/189755
PCT Pub. Date: Nov. 27, 2014

(65) Prior Publication Data
US 2016/0068619 A1   Mar. 10, 2016

Related U.S. Application Data

(60) Provisional application No. 61/825,606, filed on May 21, 2013.

(51) Int. Cl.
| C08F 16/38 | (2006.01) |
| C09D 129/14 | (2006.01) |
| C09D 129/04 | (2006.01) |
| C08F 8/28 | (2006.01) |
| C09D 11/107 | (2014.01) |
| C09D 11/037 | (2014.01) |
| C09D 11/106 | (2014.01) |

(52) U.S. Cl.
CPC .............. C08F 16/38 (2013.01); C08F 8/28 (2013.01); C09D 11/037 (2013.01); C09D 11/106 (2013.01); C09D 11/107 (2013.01); C09D 129/04 (2013.01); C09D 129/14 (2013.01)

(58) Field of Classification Search
CPC .......... C08F 8/28; C08F 16/38; C09D 129/04; C09D 129/14
See application file for complete search history.

(56) References Cited

U.S. PATENT DOCUMENTS

| 2,906,594 | A |   | 9/1959 | Osugi et al. |
| 3,170,869 | A |   | 2/1965 | Imoto |
| 4,255,490 | A | * | 3/1981 | Katsura .................... B32B 27/08 428/475.8 |
| 4,401,790 | A |   | 8/1983 | Ter Jung et al. |
| 4,499,236 | A | * | 2/1985 | Hermann .......... B32B 17/10761 525/58 |
| 4,844,828 | A | * | 7/1989 | Aoki .................... C11D 17/044 206/524.7 |
| 6,605,663 | B1 |   | 8/2003 | Weitzel |
| 2006/0192180 | A1 |   | 8/2006 | Ichitani et al. |
| 2009/0093609 | A1 |   | 4/2009 | Shibutani et al. |
| 2011/0049434 | A1 |   | 3/2011 | Ootsuki et al. |
| 2013/0071786 | A1 |   | 3/2013 | Oohashi |
| 2014/0018488 | A1 | * | 1/2014 | Kawagoe ................. H01G 4/12 524/430 |
| 2014/0147678 | A1 | * | 5/2014 | Melbye .................. B32B 27/08 428/423.5 |

FOREIGN PATENT DOCUMENTS

| CN | 1107420 A | 8/1995 |
| CN | 1187518 A | 7/1998 |
| CN | 1100837 C | 2/2003 |
| EP | 0 634 289 B1 | 5/1997 |
| EP | 0846567 A1 | 10/1998 |
| WO | 2011/11211 A1 | 9/2011 |

OTHER PUBLICATIONS

Chinese Office Action issued in Chinese Application No. 201480025335.7, dated Nov. 23, 2016.
Notification Concerning Transmittal of the International Search Report and the Written Opnion of the International Searching Authority or the Declaration issued in PCT/US2014/38142, dated Sep. 23, 2014.
Sakurada, I. Polyvinyl alcohol fibers. 1985. Marcel Dekker, Inc. pp. 1-453; p. 57, paragraph 1; p. 61, paragraph 3.
International Preliminary Report issued in PCT/US2014/038142, dated Nov. 24, 2015.
Search Report issued in Taiwan application No. 103117810 dated Oct. 27, 2017.
Chinese Office Action issued in Chinese Application No. 201480025335.7 dated Jan. 4, 2018 and translation thereof.
Japanese Office Action issued in Japanese Application No. 2016-514972 dated Jan. 5, 2018 and translation thereof.

* cited by examiner

*Primary Examiner* — Jeffrey C Mullis
(74) *Attorney, Agent, or Firm* — Charles A. Achkar; Ostrolenk Faber LLP.

(57) ABSTRACT

An in situ method of preparing modified polyvinyl acetals is described with the aim of improving the alcohol tolerance while retaining barrier properties of the base polymer.

20 Claims, No Drawings

ACETALIZED POLYVINYL ALCOHOL BARRIER COATINGS

CROSS REFERENCE TO RELATED APPLICATIONS

The present application is a § 371 National Phase application based on PCT/US2014/038142 filed May 15, 2014, which claims the benefit of U.S. Provisional Application No. 61/825,606 filed May 21, 2013, the subject matter of each of which is incorporated by reference in its entirety.

FIELD OF THE INVENTION

The present invention relates to a high alcohol tolerant modified polyvinyl acetate that retains $O_2$ barrier properties and bond strengths within laminated structures. The present invention also relates to an in situ method of preparing the high alcohol tolerant modified polyvinyl acetals.

BACKGROUND OF THE INVENTION

U.S. Pat. No. 7,674,854 describes a process for producing a poly vinyl acetal resin, polyvinyl butyral resin and a process for producing esterified poly vinyl alcohol resin. The resin having a high acetalization degree can be produced even in a solid catalyst system. A polyvinyl butyral resin produced by this approach can be performed at high efficiency even in a solid catalyst system.

U.S. Pat. No. 5,380,597 describes plasticized polyvinyl acetal resins based on 4-hydroxybutanal. It also describes laminar structures that include the resins, a process for making the resins and a process for making an internally plasticized acetal resin by esterification. The resin is isolated by washing and precipitation of the modified resin.

US2011/0049434 describes the modification of PVOH resin by acetalization. The modified PVOH resin composition is then capable of providing a ceramic green sheet possessing sufficient flexibility and sustains limited degree of damage even when being formed into a thin film. The method to acetalized PVOH requires the reaction mixture to be neutralized, washed and the precipitated resins are dried to provide a powder.

US2009/0093609 describes a polyvinyl acetal based resin, which has a high elastic modulus, is excellent in solubility to an alcoholic solvent and gives a highly transparent alcohol solution. The polyvinyl alcohol prepared by ATRP has 0.1 to 1.5% by mol of a 1, 2-diol structural units is first isolated and purified. The dried polymer is then dissolved and an acid is added followed by an aldehyde. The polyvinyl acetal is then isolated by neutralization and washing the resin.

US 2004/0260020 describes a method to provide a modified polyvinyl acetal resin possessing superior flexibility, adhesive property to a resin substrate under high humidities, heat resistance, thermal decomposition property, humidity toughness and low oxygen permeability. The modified polyvinyl acetal resin is obtainable by acetalizing a modified polyvinyl alcohol having ethylene in a random basis as a constituent unit of a main chain and an ethylene content of 1 to 20 mole % and a saponification degree of 80 mole % or more. An acetal modification of 40-80 mole % is required as the modified resin is water soluble and insoluble in organic solvent. Furthermore, the oxygen barrier is measured on PET with a coating thickness of 50 μm in which the coated substrate is dried at a temperature of 50 C for 6 hours and for a further 6 hours at room temperature under vacuum for oxygen permeation measurements. The modified polyvinyl acetals are dissolved in ethanol and toluene (1:1). The level of organic solvent would prevent the stable dispersion of nanoplatelets, which would limit the use of the modified acetals described in this patent. The reported oxygen transmission rates for the acetal modified polyvinyl alcohol and ethylene co vinyl alcohol copolymers are represented as oxygen transmission coefficient cc·cm/cm²·sec·cmHg when converted to cc m²-day (ASTM D3985). However, oxygen transmission rates far exceed the oxygen transmission rates of 100 cc m²/day for uncoated polyethylene terephthalate films at 12.5 μm and the transmission rates for any suitable application for barrier coatings of less than 10 cc m²/day.

However, the prior art fails to describe or suggest barrier coatings based on PVOH with an alcohol content of 40% or more which are storage stable.

The present invention described below relates a method of producing an in situ solution of a modified polyvinyl acetal in a blend of water and alcohol that when coated provides a barrier coating for a variety of applications. There are an increasing number of applications which require a co-solvent such as alcohols. A number of coating applications require the need for volatile solvents such as isopropanol, ethanol and n-propanol to allow certain coatings processes such as gravure and flexography to run at speeds >100 m/min. Typically, aqueous solutions of polyvinyl alcohol require slower speeds and high drying temperatures in coating applications to ensure the coatings dry prior to the next coating application. EVOH co-polymers offer greater alcohol tolerance than straight PVOH polymers due to the presence of ethylene on the backbone of poly vinyl alcohol. However, the drawbacks of increasing ethylene content in co-polymers while improving the alcohol tolerance is that gas barrier performance is reduced and short-term stability with high alcohol solvency is limited.

SUMMARY OF THE INVENTION

The present invention provides a polyvinyl acetal resin comprised of acetalized polyvinyl alcohol polymer, said resin having a saponification degree of at least 90% and a degree of acetalization of less than 25 mol %.

The present invention further provides a solution comprising the resin of the present invention and having a water content of less than 40 wt %.

The present invention also provides an in situ method for preparing a resin solution comprising:
(a) providing a solution comprising polyvinyl alcohol polymer (PVOH) with ethylene groups, alcohol and a C1-C3 aldehyde in order to achieve an acetalization of under 25 mol %; and
(b) adjusting the liquid content of the solution in order to have from about 20 to about 35 wt. % solids content, wherein, said method does not comprise any step selected from the group consisting of: isolation step, a washing step and a precipitation step.

The present invention further provides an ink or coating composition comprising the polyvinyl acetal resin of the present invention.

The present invention also provides an ink or coating composition comprising:
(a) an acetalized PVOH resin with a degree of hydrolysis (—OH) functionality of at least 75%;
(b) more than 40 wt % alcohol; and
(c) less than 40 wt % water,
wherein the ink or coating exhibits an oxygen transmission rate (OTR) of less than 10 cc m²/day.

The present invention also provides a printed article comprising the ink or coating composition of the present invention.

These and other objects, advantages, and features of the invention will become apparent to those persons skilled in the art upon reading the details of the methods and formulations as more fully described below.

DETAILED DESCRIPTION OF THE INVENTION

The present invention relates to polyvinyl alcohol (PVOH) modifications via an in situ method of preparing modified polyvinyl acetals with the aim of improving the alcohol tolerance while retaining barrier properties of the base polymer. High alcohol tolerance allows the formulator to use higher proportions of alcohol in the coating formulation so that it dries faster than water-soluble polymers that will tolerate lesser amounts of alcohol. Faster drying allows inline printing and coating by the flexo or gravure print processes at speeds of up to and above 300 m/min which is not possible with some water/alcohol based barrier systems such as Sunbar™ (Sun Chemical).

The present invention provides a polyvinyl acetal resin comprised of acetalized polyvinyl alcohol polymer, said resin having a saponification degree of at least 90% and a degree of acetalization of less than 25 mol %. Preferably, the saponification degree of the resin is at least 95%, more preferably at least 98%. Also preferably, the degree of acetalization of the resin is less than 15 mol %, more preferably less than 10 mol %. The polymer may be a homopolymer or a copolymer.

The present invention also provides an ink or coating composition comprising the polyvinyl acetal resin of the present invention. In one embodiment the ink or coating composition contain a filler pigment. Preferably, the water content of the coating or ink composition is less than 50 wt % and/or comprises more than 40 wt % lower alcohol, more preferably more 50 wt % lower alcohol.

Although there are many polyvinyl acetals such as PvB which are alcohol-soluble, they don't provide proper gas barrier properties. The approach described in the present application allows fine-tuning of the base polyvinyl alcohol in terms of alcohol tolerance without detracting from barrier performance. The high alcohol tolerant modified resin provides a stable solution. The acetalization of polyvinyl alcohols is a common process for converting the water-soluble polyvinyl alcohols into a modified acetalized resin soluble in organic solvents for a variety of applications. However, for barrier applications, the degree of acetalization is important as this can disrupt the hydrogen bonding required to provide the necessary barrier properties and this can result in an increase in the free volume within the polymer. The effects of reducing hydrogen bonding within the polymer is an increase in gas permeation.

A key feature of the present application is an in situ method for preparing a range of acetalized polyvinyl alcohols, which require no isolation step, no washing or precipitation.

Specifically, the present invention provides an in situ method for preparing a resin solution comprising:
(a) providing a solution comprising polyvinyl alcohol polymer (PVOH), preferably a copolymer, with ethylene groups, alcohol and a C1-C3 aldehyde in order to achieve an acetalization of under 25 mol %; and
(b) adjusting the liquid content of the solution in order to have from about 20 to about 35 wt. % solids content, wherein, said method does not comprise any step selected from the group consisting of: isolation step, a washing step and a precipitation step.

Preferably the solution provided in the method of the present invention does not contain an aldehyde with at least 4 carbons. Also preferably, the alcohol content is adjusted to be at least 40% and up to 60 wt % of the total weight of the resin solution.

The polyvinyl acetal can be diluted with various alcohols with varying solids from 3% to 16% solids depending on the degree of polymerization and application viscosity. The degree of acetalization is important to achieve the desired barrier properties and this also is dependent on the relative humidity under which the barrier coating is tested. The degree of acetalization is important to achieve the required alcohol tolerance >40% without increasing gas permeation. PVOH is considered a water-soluble polymer. Additions up to around 20-30% ethanol or propanol to aqueous solutions are normal and provide longer cold storage stability and help increase the drying speed of coatings formulations. PVOH and EVOH co-polymers are available at varying molecular weights. The in situ modified polyvinyl alcohol of the present application can surprisingly tolerate dilution with significantly higher levels of lower alcohols up to and often beyond 40%. This property enables the formulation of coatings with higher polymer solids contents than conventional products and unusually high levels of alcohol diluents. Both of these features combine to give faster drying coatings when applying similar dry film weights compared to the more established PVOH formulations based on higher molecular weight grades with equivalent desirable properties such as oxygen and carbon dioxide barriers. The result is fast drying, high solids (gas) barrier coatings suitable for application with traditional printing processes, preferably common impression flexographic printing presses, in line with printing inks to produce printed articles with gas barrier properties suitable for various types of packaging (e.g. food packaging) in a single operation.

Lower alcohols is a term used herein to define hydroxyl containing organic compounds, more specifically monohydric alcohols, bearing just one hydroxyl group with a carbon number of between C1 and C4, more preferably between C2 and C4 and even more preferably between C2 and C3.

The in situ preparation method of the present invention results in high alcohol tolerant modified polyvinyl acetals which is amenable to scale up and does not require isolation of the resins, washing stage or drying of the resins. The method provides modified PVOH's with good solution stability whilst retaining $O_2$ barrier properties and bond strengths within laminated structures. A further aspect of the present application is that the high alcohol tolerant resin can be blended with a variety of nanoplatelets (fillers, clays, extender pigments, etc.) to provide stable dispersions with an aim of further improving the barrier properties. The barrier coatings can be applied by various methods, more importantly can be applied in-line via flexo or gravure processes with or without nanoplatelet-dispersions, to provide a fast drying coating system with good oxygen barrier properties.

The following are technical advantages of the method of the present invention over prior art:
1. No need for complicated polymer synthesis, which would involve the need to isolate the modified resin, washing the precipitated resin and drying.
2. Significant cost savings and time involved to prepare the modified resin.
3. Application amenable to scale-up.

4. Properties of original polymer retained and able to tolerate high alcohol content.
5. No need for additives to improve properties of the polymer (e.g. bond strengths in laminated structures or oxygen barrier with/or without the presence of nanoplatelets).
6. High solids possible without significant increases in viscosity.
7. Modified solutions are stable in high alcohol content.
8. Oxygen barrier coatings are able to run in-line for flexo and gravure printing processes, reducing time and costs due to the ability of high alcohol tolerant modified resins drying typically 3 to 4 times as fast as non-modified polyvinyl alcohols.
9. Retained solvents are well under the specific migration limit (SML) when calculated according to the EU packaging model (600 $cm^2$ of package surrounding 1 kg food). The specific migration limit is a value used in Europe according to the Plastics Directive to define the maximum permitted amount of a substance allowed in a food and is usually quoted in mg (of substance)/Kg (food).
10. Minimally retained aldehyde, which is less than the specific migration limit for the aldehyde used. Acetaldehyde has a specific migration limit (SML) of 6 mg/kg, whereas propanal has a SML of 60 mg/kg. Our analyses of printed material indicate that the retained levels of aldehydes are so small that it would be impossible to breach the SMLs of the stated aldehydes. In the US, acetaldehyde is allowed as a food additive.
11. Oxygen transmission rate of <10 cc $m^2$/day at <0.6 μm dry film weight.

As indicated above, the present application relates to gas barrier coatings, particularly having the ability to block the ingress of oxygen and other gases such as carbon dioxide, and which may be used to coat and impart gas barrier properties to a variety of materials, notably packaging for foods and pharmaceuticals, where exposure to oxygen needs to be eliminated or restricted. The coating can be in the form of monoweb or part of a multi-layer laminate structure.

Another aspect of the present application is that fillers or extender pigments dispersed in the polymer solution may be used to create a tortuous pathway in the dry film, which further hinders the passage of gases such as oxygen and carbon dioxide and moisture. Clay minerals with aspect ratios between 20 and 10,000 are preferably used. Particularly preferred are those minerals having an aspect ratio greater than 100. Examples of suitable materials include kaolinite, montmorillonite, vermiculite, atapulgite, illite, bentonite, halloysite, kaolin, mica, diatomaceous earth and fuller's earth, calcined aluminium silicate, hydrated aluminium silicate, magnesium aluminium silicate, sodium silicate and magnesium silicate. Commercial examples of suitable materials are Cloisite Na+ (available from Southern Clay) and Bentone ND (available from Elementis). Of these, the clays, especially the montmorillonite clays, are preferred with nanoparticulate clays being most preferred.

The present application relies on the use of polyvinyl alcohol (PVOH), a polyhydroxy polymer, which is the largest volume, synthetic water-soluble resin produced in the world. The excellent adhesion capacity of PVOH to cellulosic materials makes it useful as an adhesive and coating material, highly resistant to solvents, oil, and grease. The chemical resistance and physical properties of PVOH and resins have resulted in broad industrial use such as textile sizing, adhesives, protective colloids for emulsion polymerization, fibres, production of poly(vinyl butyral), and paper sizing. The predominant use and application of these types of polymers are either via co-extrusion of pellets or from aqueous solution of PVOH. PVOH has been used extensively in barrier applications for food packaging, packaging for medicinal products where in the ingress of oxygen and other gases is reduced.

Typically, prior art solutions based on co-solvents of water and alcohol show short-term cold (~1-6° C.) storage stability of around 3-6 months. When allowed to stand for long periods at room temperature or at low temperature, the viscosity of these solutions increases progressively with time and the fluidity ultimately disappears resulting in a gel. However, only PVOH with a high degree of hydrolysis (>95%) provides oxygen and carbon dioxide barriers. Hydrogen bonding between hydroxyls on the backbone of PVOH reduces the free volume while increasing the tortuous path for oxygen and carbon dioxide.

Increases in viscosity can thus be an indicator for gelation. Increases in viscosity are known to be dependent on a number of factors, for example the solvent and temperature at which vinyl acetate is polymerized ultimately impacting on the solution stability over time. The dynamic response of gelation depends more on the crystalizability of PVOH and this can be retarded by the presence of irregular structures such as co-monomers and 1, 2-glycol linkages and also by tacticity and branching effects, but usually at the expense of gas barrier properties. The regularity of the PVOH or structures influence the degree to which it is rigid, crystalline, long-range order within the structure or a flexible, amorphous long-range disorder, for barrier applications crystallinity of the PVOH is important.

The present invention is based on understanding of the barrier properties of the in situ prepared polyvinyl acetals and the degree of acetalization vs. the alcohol tolerance vs. the barrier performance for gas barrier applications. The result is a method that allows modified polyvinyl acetal to be prepared in situ without any need to isolate the resin. The polyvinyl acetal prepared is able to tolerate a co-solvent in which the alcohol content is 40% or greater. This allows solution storage stability over longer periods, more importantly to be compatible with inline printing processes or coating applications where there is a need to run at higher speeds and where drying temperatures are limited by the coating/printing process. A further extension of the present application to allow for the use of fillers to further improve the gas barrier properties of the coating while keeping the overall alcohol content at 40% or greater.

The present invention demonstrates that gas barrier properties with and without filler can be achieved where a modified polyvinyl acetal has a preferred degree of acetal modification from 8 mole % to 20 mole %, more preferably <20 mole %, and most preferably <15 mol %. The PVOH of the present invention has a preferable degree of polymerization of 100-2000. The modified polyvinyl acetal is dissolved in situ in water with a co-solvent, usually an alcohol, in which the alcohol content is preferably 40% or more and provides a stable solution at room temperature. The PVOH and co-polymer with a high alcohol content of 40% or more can be further improved with filler to impart a tortuous pathway to the transmission of gases. The prior art does not describe barrier coatings based on PVOH with an alcohol content of 40% or more which are storage stable.

The invention and examples demonstrate that good gas barrier properties with and without filler can be achieved where a polyvinyl alcohol has a viscosity, as measured by a Brookfield viscometer, of a 4% solution at 20° C. is preferably <than 4.5 mPas, more preferably <than 3.8 mPas, and most preferably <3.2 mPas. In a preferred embodiment, the PVOH has a molecular weight distribution of <16000 Da, more preferably <12000 Da, and most preferably <than 7000 Da. The PVOH is dissolved in a co-solvent of water and an alcohol, in which the alcohol content is preferably >40%, more preferably >50%, and provides a stable solution at room temperature. The PVOH with a high alcohol content of 40% or more can be further improved with filler to impart a tortuous pathway for gases in the coating. There are no known examples of barrier coatings based on PVOH with an alcohol content of 40% or more which are stable for up to 4 months and more. Despite the high alcohol content of the acetalized PVOH solution, it is still possible to exfoliate and stabilize hydrophilic nanoplatelet clay fillers in order to gain further improvements in barrier through the tortuous path formed when the coating is applied.

Inks or coatings made from the modified polyvinyl acetal resins of the present invention are preferably used as non-pigmented gas barrier coatings. However, colorants may be utilized to tint the inks or coatings. Suitable colorants include, but are not limited to organic or inorganic pigments and dyes. The dyes include but are not limited to azo dyes, anthraquinone dyes, xanthene dyes, azine dyes, combinations thereof and the like.

As with most ink and coating compositions, additives may be incorporated to enhance various properties. A partial list of such additives includes but is not limited to adhesion promoters, light stabilizers, de-gassing additives, flow promoters, defoamers, antioxidants, UV stabilizers, surfactants, dispersants, plasticizers, rheological additives, waxes, silicones, etc.

The present invention has been described in detail, including the preferred embodiments thereof. However, it will be appreciated that those skilled in the art, upon consideration of the present disclosure, may make modifications and/or improvements on this invention that fall within the scope and spirit of the invention.

EXAMPLES

The following examples illustrate specific aspects of the present invention and are not intended to limit the scope thereof in any respect and should not be so construed.
Test Methods
% Non-Volatile Content (% NVC)

The test involves weighing approximately 1 g of a coating into a Petri dish, the actual weight being recorded to two decimal places. This is then placed in an electrically heated fan assisted oven for 30 minutes at 150° C. The sample is then cooled to room temperature and re-weighed.

The % NVC is calculated as follows:

% NVC=final weight of dry coating÷Initial weight of wet coating×100

Storage Stability

An initial viscosity of coating solution is measured using (Seta) Zahn cup #2 at 23° C. 100 g of the coating solution is placed in a tightly sealed glass jar in a refrigerator set at 4° C. The sample is removed periodically (Every 4-5 days) and its viscosity measured. Changes in viscosity or appearance and homogeneity are considered negative factors, such as increases in viscosity of >25 for gravure and >30 for flexo printing processes measured as secs Zahn #2 above initial measurement which is set as application viscosity. Good storage stability is also evident by no visible phase separation, and no clouding of solution of >14 Formazine Turbidity Units (FTU's). FTU's are measured using a turbidity meter to determine the turbidity of water/water alcohol based systems using an IR LED light source emitted at a wavelength peaking at 890 nm. A sensor is position at 90° with respect to the direction of the light, which detects the amount of scattered light by the undissolved particles present in the sample. Measurements cover 0 to 1000 FTU's. The range for our measurements was set from 0-50 FTU's all compared and calibrated against the primary standards that come with the meter AMCO-AEPA-1.

Oxygen Transmission Rate (OTR)

The oxygen transmission rates (OTR) of the coatings when applied to a polyester film were determined on a Mocon Oxtran 2/21 gas permeability tester at 23° C. and 0/65% relative humidity. This condition represents the normal test protocol for dry food packaging. Wherein the permeant gas ($O_2$) is adjusted to 65% RH (23° C.) and the carrier gas (100% N2) to 0% RH (23° C.).

The substrate used was freshly corona discharge treated 12 micron Mylar 800 or Melinex S (ex DuPont). The coatings were applied with a No. 0 K-Bar (ex. RK Print; delivering about 4 microns wet film thickness) and were dried in a warm flow of air (lab prints were dried with a hair dryer).

Drying Speed (Lab Test)

The coating solution is applied using a No 0 K bar (Manufactured by RK Print Coat UK Ltd) to 12 micron Melinex S substrate that is freshly corona treated. A No 0 K bar is used to apply the coating at approximately 4 grams per square meter wet film weight. Immediately after drawing down the coating film, a stopwatch is started and the surface of the coating is examined at 5 second intervals by touching until the coating feels dry and there is no transfer of wet coating to the fingertip or apparent stickiness, whereupon the time taken to reach this condition is recorded.

Drying Speed (Press Test)

Coating examples were evaluated on a Windmoller & Holscher (6-color common impression) Soloflex flexographic press. The coating under evaluation was pumped to print unit one and a typical comparative packaging ink in the last print unit, No 6. The drying air temperature of the press was set at 60° C. and freshly corona treated Melinex S fed from the feed reel to the delivery reel. The speed of the press is gradually increased until such point that the packaging ink in unit No. 6 no longer transfers satisfactorily to the coating applied from unit No 1. At this point, the test is stopped and the speed reached just before the poor transference occurred is recorded. When the maximum speed of the press is reached without problems, the packaging ink is taken out of unit No 6 and placed in unit No 5 and the trial continued in this fashion until the speed at which failure to transfer properly is reached. The higher the speed (measured in m/min) and the lower the print unit number, indicates the faster drying examples.

Lamination Bond Strength

Laminates were prepared by applying the coating to the treated side of polyester film, an adhesive was applied over the top of the dried coating then laminated to the treated side of a 30 μm gauge poly(ethene). The adhesive used was supplied in two parts by Henkel labeled LIOFOL UR39662 and UR6055 These were mixed just before application in the weight ratio of 33.3 parts UR39662 and 2.67 parts UR6055 and diluted with 64.03 parts of ethyl acetate according to the manufacturer's instructions and applied so as to achieve a final dry film weight of 4.32 gsm. The laminates were then stored for 14 days at 25° C. to ensure full cure of the isocyanate-based adhesive. Bond strengths were measured on a JJ Lloyd LRX tensiometer using a cross head speed of 30 mm/min under 'T' peel separation conditions. Laminate samples were 15 mm wide and results are given in grams force per 15 mm.

Hereinafter, the present invention will be described in more detail by way of examples, but the present invention is not limited to these examples.

Resins #1-10 from Examples 1-10 below could be used as barrier coatings or further modified (e.g. with filler) to provide barrier coatings with improved properties.

Example 1—In Situ Preparation of Modified Polyvinyl Alcohol Resin #1

To a reaction vessel was added 62.39 parts of deionzed water followed by heating the vessel to 60° C. Kuraray supplied Mowiol 2-97 14.40 parts was added over 10-15 minutes. Once the addition was complete, 19.2 parts of isopropyl alcohol was added. The reaction vessel was heated to 90° C. until the polyvinyl alcohol dissolved. The reactor was then cooled to 40° C. Once at 40° C., 0.69 parts of hydrochloric acid was added slowly. The pH ~1-2 was measured and then 0.92 parts of acetaldehyde in 1.2 parts of isopropyl alcohol were added to the reactor. The contents of the reactor were mixed for 4 hours at 40° C. and reaction neutralized with 1.2 parts of aqueous ammonia. The reactor was stirred for a further 1.5 hours. The solids were measured at this stage and provided a solids of 15.29%, representing a yield of 99.5%. The contents of the reactor were then reduced by removing volatiles such as isopropanol, water, ammonia and any residual acetaldehyde from the reactor until the batch is at 30-32% solids. To this was added ethanol and adjusted accordingly until the final composition was 57 parts ethanol, 29.5 parts deionzed water and 13.5 parts modified polyvinyl acetal with a degree of saponification of >97%.

Example 2—In Situ Preparation of Modified Polyvinyl Alcohol Resin #2

To a reaction vessel was added 62.32 parts of deionzed water followed by heating the vessel to 60° C. Kuraray supplied Mowiol 2-97 14.38 parts was added over 10-15 minutes. Once the addition was complete 19.17 parts of isopropyl alcohol was added. The reaction vessel was heated to 90° C. until the polyvinyl alcohol dissolved. The reactor was then cooled to 40° C. Once at 40° C. 0.69 parts of hydrochloric acid was added slowly. The pH ~1-2 was measured and then 1.04 parts of acetaldehyde in 1.2 parts of isopropyl alcohol were added to the reactor. The contents of the reactor were mixed for 4 hours at 40° C. and reaction neutralized with 1.2 parts of aqueous ammonia. The reactor was stirred for a further 1.5 hours. The solids were measured at this stage and provided a solids of 15.38%, representing a yield of 99.8%. The contents of the reactor were then reduced by removing volatiles such as isopropanol, water, ammonia and any residual acetaldehyde from the reactor until the batch is at 30-32% solids. To this was added ethanol and adjusted accordingly until the final composition was 57.8 parts ethanol, 28.9 parts deionzed water and 13.3 parts modified polyvinyl acetal with a degree of saponification of >97%.

Example 3—In Situ Preparation of Modified Polyvinyl Alcohol Resin #3

To a reaction vessel was added 62.26 parts of deionzed water followed by heating the vessel to 60° C. Kuraray supplied Mowiol 2-97 14.37 parts was added over 10-15 minutes. Once the addition was complete 19.15 parts of isopropyl alcohol was added. The reaction vessel was heated to 90° C. until the polyvinyl alcohol dissolved. The reactor was then cooled to 40° C. Once at 40° C. 0.69 parts of hydrochloric acid was added slowly. The pH ~1-2 was measured and then 1.15 parts of acetaldehyde in 1.19 parts of isopropyl alcohol were added to the reactor. The contents of the reactor were mixed for 4 hours at 40° C. and reaction neutralized with 1.19 parts of aqueous ammonia. The reactor was stirred for a further 1.5 hours. The solids were measured at this stage and provided a solids of 15.18%, representing a yield of 98.2%. The contents of the reactor were then reduced under vacuum by removing volatiles such as isopropanol, water, ammonia and any residual acetaldehyde from the reactor until the batch is at 30-32% solids. To this was added ethanol and adjusted accordingly until the final composition was 57 parts ethanol, 29.5 parts deionzed water and 13.5 parts modified polyvinyl acetal with a degree of saponification of >97%.

Example 4—In Situ Preparation of Modified Polyvinyl Alcohol Resin #4

To a reaction vessel was added 61.9 parts of deionzed water followed by heating the vessel to 60° C. Kuraray supplied Mowiol 2-97 14.28 parts was added over 10-15 minutes. Once the addition was complete 19.04 parts of isopropyl alcohol was added. The reaction vessel was heated to 90° C. until the polyvinyl alcohol dissolved. The reactor was then cooled to 40° C. Once at 40° C. 0.68 parts of hydrochloric acid was added slowly. The pH ~1-2 was measured and then 1.72 parts of acetaldehyde in 1.19 parts of isopropyl alcohol were added to the reactor. The contents of the reactor were mixed for 4 hours at 40° C. and reaction neutralized with 1.19 parts of aqueous ammonia. The reactor was stirred for a further 1.5 hours. The solids were measured at this stage and provided a solids of 15.63%, representing a yield of 98%. The contents of the reactor were then reduced by removing volatiles such as isopropanol, water, ammonia and any residual acetaldehyde from the reactor until the batch is at 30-32% solids. To this was added ethanol and adjusted accordingly until the final composition was 60 parts ethanol, 26 parts deionzed water and 14 parts modified polyvinyl acetal with a degree of saponification of >97%.

Example 5—In Situ Preparation of Modified Polyvinyl Alcohol Resin #5

To a reaction vessel was added 63.16 parts of deionzed water followed by heating the vessel to 60° C. Kuraray supplied Poval 102 14.58 parts was added over 10-15 minutes. Once the addition was complete 19.44 parts of isopropyl alcohol was added. The reaction vessel was heated to 90° C. until the polyvinyl alcohol dissolved. The reactor was then cooled to 40° C. Once at 40° C. 0.81 parts of hydrochloric acid was added slowly. The pH ~1-2 was measured and then 0.71 parts of propanal was added to the reactor. The contents of the reactor were mixed for 4 hours at 40° C. and reaction neutralized with 1.3 parts of aqueous ammonia. The reactor was stirred for a further 1.5 hours. The solids were measured at this stage and provided a solids of 15.1%, representing a yield of 98.8%. The contents of the reactor were then reduced by removing volatiles such as isopropanol, water, ammonia and any residual acetaldehyde from the reactor until the batch is at 30-32% solids. To this was added ethanol and adjusted accordingly until the final composition was 53 parts ethanol, 34.2 parts deionzed water and 12.8 parts modified polyvinyl acetal with a degree of saponification of >98%.

Example 6—In Situ Preparation of Modified Polyvinyl Alcohol Resin #6

To a reaction vessel was added 62.96 parts of deionzed water followed by heating the vessel to 60° C. Kuraray supplied Poval 102 14.53 parts was added over 10-15 minutes. Once the addition was complete 19.37 parts of isopropyl alcohol was added. The reaction vessel was heated to 90° C. until the polyvinyl alcohol dissolved. The reactor was then cooled to 40° C. Once at 40° C. 0.81 parts of hydrochloric acid was added slowly. The pH ~1-2 was measured and then 1.03 parts of propanal was added to the reactor. The contents of the reactor were mixed for 4 hours at 40° C. and reaction neutralized with 1.3 parts of aqueous ammonia. The reactor was stirred for a further 1.5 hours. The solids were measured at this stage and provided a solids of 15.4%, representing a yield of 99%. The contents of the reactor were then reduced by removing volatiles such as isopropanol, water, ammonia and any residual acetaldehyde from the reactor until the batch is at 30-32% solids. To this was added ethanol and adjusted accordingly until the final composition was 53 parts ethanol, 33.5 parts deionzed water and 13.5 parts modified polyvinyl acetal with a degree of saponification of >98%.

Example 7—In Situ Preparation of Modified Polyvinyl Alcohol Resin #7

To a reaction vessel was added 62.73 parts of deionzed water followed by heating the vessel to 60° C. Kuraray supplied Poval 102 14.48 parts was added over 10-15 minutes. Once the addition was complete 19.3 parts of isopropyl alcohol was added. The reaction vessel was heated to 90° C. until the polyvinyl alcohol dissolved. The reactor was then cooled to 40° C. Once at 40° C. 0.8 parts of hydrochloric acid was added slowly. The pH ~1-2 was measured and then 1.4 parts of propanal was added to the reactor. The contents of the reactor were mixed for 4 hours at 40° C. and reaction neutralized with 1.29 parts of aqueous ammonia. The reactor was stirred for a further 1.5 hours. The solids were measured at this stage and provided a solids of 15.73%, representing a yield of 99.1%. The contents of the reactor were then reduced by removing volatiles such as isopropanol, water, ammonia and any residual acetaldehyde from the reactor until the batch is at 30-32% solids. To this was added ethanol and adjusted accordingly until the final composition was 53 parts ethanol, 33.7 parts deionzed water and 13.3 parts modified polyvinyl acetal with a degree of saponification of >98%.

Example 8—In Situ Preparation of Modified Polyvinyl Alcohol Resin #8

To a reaction vessel was added 62.5 parts of deionzed water followed by heating the vessel to 60° C. Kuraray supplied Poval 102 14.42 parts was added over 10-15 minutes. Once the addition was complete 19.23 parts of isopropyl alcohol was added. The reaction vessel was heated to 90° C. until the polyvinyl alcohol dissolved. The reactor was then cooled to 40° C. Once at 40° C. 0.69 parts of hydrochloric acid was added slowly. The pH ~1-2 was measured and then 1.06 parts of acetaldehyde was added to the reactor. The contents of the reactor were mixed for 4 hours at 40° C. and reaction neutralized with 2.1 parts of aqueous ammonia. The reactor was stirred for a further 1.5 hours. The solids were measured at this stage and provided a solids of 15.2%, representing a yield of 98.2%. The contents of the reactor were then reduced by removing volatiles such as isopropanol, water, ammonia and any residual acetaldehyde from the reactor until the batch is at 30-32% solids. To this was added ethanol and adjusted accordingly until the final composition was 55 parts ethanol, 31.77 parts deionzed water and 13.23 parts modified polyvinyl acetal with a degree of saponification of >98%.

Example 9—In Situ Preparation of Modified Polyvinyl Alcohol Resin #9

To a reaction vessel was added 61.94 parts of deionzed water followed by heating the vessel to 60° C. DuPont supplied Elvanol 70-03 14.33 parts was added over 10-15 minutes. Once the addition was complete 19.11 parts of isopropyl alcohol was added. The reaction vessel was heated to 90° C. until the polyvinyl alcohol dissolved. The reactor was then cooled to 40° C. Once at 40° C. 0.69 parts of hydrochloric acid was added slowly. The pH ~1-2 was measured and then 1.03 parts of acetaldehyde in 1.2 parts of isopropyl alcohol were added to the reactor. The contents of the reactor were mixed for 4 hours at 40° C. and reaction neutralized with 1.7 parts of aqueous ammonia. The reactor was stirred for a further 1.5 hours. The solids were measured at this stage and provided a solids of 15.21%, representing a yield of 99%. The contents of the reactor were then reduced by removing volatiles such as isopropanol, water, ammonia and any residual acetaldehyde from the reactor until the batch is at 30-32% solids. To this was added ethanol and adjusted accordingly until the final composition was 57 parts ethanol, 30.5 parts deionzed water and 12.5 parts modified polyvinyl acetal with a degree of saponification of >98%.

Example 10—In Situ Preparation of Modified Polyvinyl Alcohol Resin #10

To a reaction vessel was added 61.47 parts of deionzed water followed by heating the vessel to 60° C. DuPont supplied Elvanol 70-03 14.24 parts was added over 10-15 minutes. Once the addition was complete 19 parts of isopropyl alcohol was added. The reaction vessel was heated to 90° C. until the polyvinyl alcohol dissolved. The reactor was then cooled to 40° C. Once at 40° C. 0.68 parts of hydrochloric acid was added slowly. The pH ~1-2 was measured and then 1.71 parts of acetaldehyde in 1.2 parts of isopropyl alcohol were added to the reactor. The contents of the reactor were mixed for 4 hours at 40° C. and reaction neutralized with 1.7 parts of aqueous ammonia. The reactor was stirred for a further 1.5 hours. The solids were measured at this stage and provided a solids of 15.47%, representing a yield of 97%. The contents of the reactor were then reduced by removing volatiles such as isopropanol, water, ammonia and any residual acetaldehyde from the reactor until the batch is at 30-32% solids. To this was added ethanol and adjusted accordingly until the final composition was 57 parts ethanol, 30.5 parts deionzed water and 12.5 parts modified polyvinyl acetal with a degree of saponification of >98%.

Example 11—In Situ Preparation of Modified Polyvinyl Alcohol Resin #11

To a reaction vessel was added 62.63 parts of deionzed water followed by heating the vessel to 60° C. Kuraray supplied Exceval AQ4104 14.45 parts was added over 10-15 minutes. Once the addition was complete 19.3 parts of isopropyl alcohol was added. The reaction vessel was heated to 90° C. until the polyvinyl alcohol dissolved. The reactor was then cooled to 40° C. Once at 40° C. 0.69 parts of hydrochloric acid was added slowly. The pH ~1-2 was measured and then 0.51 parts of propanal in 1.21 parts of isopropyl alcohol were added to the reactor. The contents of the reactor were mixed for 4 hours at 40° C. and reaction neutralized with 1.21 parts of aqueous ammonia. The reactor was stirred for a further 1.5 hours. The solids were measured at this stage and provided a solids of 14.65%, representing a yield of 97.8%. The contents of the reactor were then reduced by removing volatiles such as isopropanol, water, ammonia and any residual acetaldehyde from the reactor until the batch is at 30-32% solids. To this was added ethanol and adjusted accordingly until the final composition was 50 parts ethanol, 38.35 parts deionzed water and 11.65 parts modified polyvinyl acetal with a degree of saponification of >98%.

Example 12—In Situ Preparation of Modified Polyvinyl Alcohol Resin #12

To a reaction vessel was added 62.57 parts of deionzed water followed by heating the vessel to 60° C. Kuraray supplied Exceval AQ4104 14.44 parts was added over 10-15 minutes. Once the addition was complete 19.24 parts of isopropyl alcohol was added. The reaction vessel was heated to 90° C. until the polyvinyl alcohol dissolved. The reactor was then cooled to 40° C. Once at 40° C. 0.69 parts of hydrochloric acid was added slowly. The pH ~1-2 was measured and then 0.66 parts of propanal in 1.2 parts of isopropyl alcohol were added to the reactor. The contents of the reactor were mixed for 4 hours at 40° C. and reaction neutralized with 1.2 parts of aqueous ammonia. The reactor was stirred for a further 1.5 hours. The solids were measured at this stage and provided a solids of 14.6%, representing a yield of 96.7%. The contents of the reactor were then reduced by removing volatiles such as isopropanol, water, ammonia and any residual acetaldehyde from the reactor until the batch is at 30-33% solids. To this was added ethanol and adjusted accordingly until the final composition was 56 parts ethanol, 32.51 parts deionzed water and 11.49 parts modified polyvinyl acetal with a degree of saponification of >98%.

Example 13—In Situ Preparation of Modified Polyvinyl Alcohol Resin #13

To a reaction vessel was added 62.5 parts of deionzed water followed by heating the vessel to 60° C. Kuraray supplied Exceval AQ4104 14.42 parts was added over 10-15 minutes. Once the addition was complete 19.22 parts of isopropyl alcohol was added. The reaction vessel was heated to 90° C. until the polyvinyl alcohol dissolved. The reactor was then cooled to 40° C. Once at 40° C. 0.69 parts of hydrochloric acid was added slowly. The pH ~1-2 was measured and then 0.77 parts of propanal in 1.2 parts of isopropyl alcohol were added to the reactor. The contents of the reactor were mixed for 4 hours at 40° C. and reaction neutralized with 1.2 parts of aqueous ammonia. The reactor was stirred for a further 1.5 hours. The solids were measured at this stage and provided a solids of 14.8%, representing a yield of 97.7%. The contents of the reactor were then reduced by removing volatiles such as isopropanol, water, ammonia and any residual acetaldehyde from the reactor until the batch is at 30-33% solids. To this was added ethanol and adjusted accordingly until the final composition was 56.7 parts ethanol, 31.7 parts deionzed water and 11.6 parts modified polyvinyl acetal with a degree of saponification of >98%.

Example 14—In Situ Preparation of Modified Polyvinyl Alcohol Resin #14

To a reaction vessel was added 62.34 parts of deionzed water followed by heating the vessel to 60° C. Kuraray supplied Exceval AQ4104 14.38 parts was added over 10-15 minutes. Once the addition was complete 19.17 parts of isopropyl alcohol was added. The reaction vessel was heated to 90° C. until the polyvinyl alcohol dissolved. The reactor was then cooled to 40° C. Once at 40° C. 0.69 parts of hydrochloric acid was added slowly. The pH ~1-2 was measured and then 1.02 parts of propanal in 1.2 parts of isopropyl alcohol were added to the reactor. The contents of the reactor were mixed for 4 hours at 40° C. and reaction neutralized with 1.2 parts of aqueous ammonia. The reactor was stirred for a further 1.5 hours. The solids were measured at this stage and provided a solids of 15.3%, representing a yield of 99%. The contents of the reactor were then reduced by removing volatiles such as isopropanol, water, ammonia and any residual acetaldehyde from the reactor until the batch is at 30-33% solids. To this was added ethanol and adjusted accordingly until the final composition was 50.1 parts ethanol, 38.46 parts deionzed water and 11.44 parts modified polyvinyl acetal with a degree of saponification of >98%.

Example 15—In Situ Preparation of Modified Polyvinyl Alcohol Resin #15

To a reaction vessel was added 62.18 parts of deionzed water followed by heating the vessel to 60° C. Kuraray supplied Exceval AQ4104 14.35 parts was added over 10-15 minutes. Once the addition was complete 19.13 parts of isopropyl alcohol was added. The reaction vessel was heated to 90° C. until the polyvinyl alcohol dissolved. The reactor was then cooled to 40° C. Once at 40° C. 0.69 parts of hydrochloric acid was added slowly. The pH ~1-2 was measured and then 1.27 parts of propanal in 1.19 parts of isopropyl alcohol were added to the reactor. The contents of the reactor were mixed for 4 hours at 40° C. and reaction neutralized with 1.19 parts of aqueous ammonia. The reactor was stirred for a further 1.5 hours. The solids were measured at this stage and provided a solids of 15.4%, representing a yield of 98.3%. The contents of the reactor were then reduced by removing volatiles such as isopropanol, water, ammonia and any residual acetaldehyde from the reactor until the batch is at 30-33% solids. To this was added ethanol and adjusted accordingly until the final composition was 59.1 parts ethanol, 29.22 parts deionzed water and 11.68 parts modified polyvinyl acetal with a degree of saponification of >98%.

Test Results

Examples 1-15 were applied at 4 gsm wet No. 0 K Bar (available from RK Print UK) on to 12 μm PET dried for 4-6 seconds via a standard hair dryer. An oxygen transmission rate (OTR) of <10 cc m$^2$/day is preferred; more preferred is an oxygen transmission rate of <5 cc m$^2$/day; even more preferred is an oxygen transmission rate of <3.5 cc m$^2$/day; most preferred is an oxygen transmission rate of <2.6 cc m$^2$/day. Table 1 shows that coatings based on the resins of the present application have acceptable OTR.

TABLE 1

Oxygen Transmission Rates (OTR) of coatings containing Resins #1-15.

| Example | Dry film wt (μm) | Oxygen transmission (cc m²/day RH 65/0%, 23° C.) |
|---|---|---|
| 1 | 0.54 | 1.95 |
| 2 | 0.54 | 1.98 |
| 3 | 0.532 | 3.1 |
| 4 | 0.56 | 6 |
| 5 | 0.512 | 2.2 |
| 6 | 0.54 | 2.5 |
| 7 | 0.532 | 4 |
| 8 | 0.53 | 1.9 |
| 9 | 0.5 | 1.3 |
| 10 | 0.5 | 8 |
| 11 | 0.47 | 1.73 |
| 12 | 0.46 | 2.09 |
| 13 | 0.464 | 2.1 |
| 14 | 0.458 | 3.4 |
| 15 | 0.467 | 6.7 |

Examples 16-20—Preparation and Testing of Coatings #1-5 with Resins #1, 7, 8, 9 and Comparative SunBar Resin The solutions of Resins #1, 7, 8 and 9 from Examples 1, 7, 8 and 9 were further modified by the addition of exfoliated bentonite clay. The clay is supplied by Southern Clays Inc as Cloisite Na+. Formulations of Coatings #1-5 are provided below as Example 16, 17, 18 and 19 with Comparative Example 20 respectively. Care was taken to ensure that the correct amount of alcohol was present so as not to cause solution or clay dispersion instability in each case. The clay composite formulations were compared alongside the unmodified solutions of Comparative Example 20 on a Windmoeller and Holscher 6 colour Soloflex common impression flexographic press. Comparative Example 20 represents the commercially available product with a degree of saponification of >98%, SunBar (Sun Chemical) Gen 1.0 (parts A&B combined).

Coatings were applied at 2.5-3 gsm wet onto freshly corona treated Mylar 800 PET drying at 50° C.

TABLE 2

Coatings #1-5 Compositions with Added Filler and OTR.

| | Coating# | | | | |
|---|---|---|---|---|---|
| | 1 | 2 | 3 | 4 | 5 (comparative) |
| Modified PvOH | (Ex. 1) 6.75 | (Ex. 7) 6.62 | (Ex. 8) 6.75 | (Ex. 9) 6.25 | |
| Commercial PvOH | | | | | 4 |
| Ethanol | 52.5 | 52.5 | 52.5 | 52.5 | |
| N-propanol | | | | | 10 |
| Iso-propanol | | | | | 15 |
| DI H20 | 38.75 | 38.88 | 38.75 | 39.25 | 69.5 |
| Cloisite Na+ | 2 | 2 | 2 | 2 | 1.5 |
| Total | 100.00 | 100.00 | 100.00 | 100.00 | 100.00 |
| Non Volatiles | 8.75 | 8.62 | 8.75 | 8.25 | 5.5 |
| Dry film wt (μm) | 0.35 | 0.34 | 0.35 | 0.33 | 0.22 |
| OTR (cc m2/day 65/0% RH) | 1.4 | 0.84 | 1.5 | 0.9 | 1.6 |

Table 2 shows that the addition of filler (in this case exfoliated bentonite clay) further improves OTR.

TABLE 3

Drying Speed of Resin#1 and Coatings#16 and 20

| Examples | Drying Speed m/min LIMIT[1] | Drying Speed m/min with NC Packaging Ink[2] | Viscosity 20° C. Zahn 2 sec |
|---|---|---|---|
| Coating#5 (comparative) | 130 | 35 | 21 |
| Resin#1 | 160 | 100 | 27 |
| Coating#1 | 160 | 100 | 31 |

[1]As outlined in the "Test Methods" section of the present application, the drying speed results in Table 3 were obtained from a print trial on a Windmoller & Holscher (6-color common impression) Soloflex flexographic press, which has a maximum speed of 160 m/min. Thus, Resin#1 and Coating#1 dried at the maximum available press speed and it can be supposed that they would dry at faster speeds if the press was so capable. The maximum press speed at which Comparative Resin#5 dried is 130 m/min, showing that the Inventive Resin#1 and Coating#1 samples are faster drying than Comparative Coating#5.
[2]This column represents a further print trial in which FlexoMax (commercially available nitrocellulose packaging ink from Sun Chemical) was printed over the top of the ink/coating Examples. In this trial, Resin#1 and Coating#1 dried nearly 3 times faster than Comparative Coating#5.

Comparisons of drying speed and drying speed of coatings printed in-line with an over print NC ink are shown in Table 3.

The press trials described above were performed on a Windmoller & Holscher Soloflex flexographic press, which has a maximum speed of 160 m/min, but the inks and coatings of the present invention would be expected to perform equally well on faster presses with better/faster drying capability (an example of a CI flexo press with higher heating/drying capacity might be a Flexotechnica N8G (eight color CI) made by Cerutti). Thus, it can be postulated that the inks of the present invention would perform well and dry properly at or near the maximum speed of virtually any press, many of which have speeds of 300 m/min, 400 m/min and possibly higher.

The results indicate that when the coatings are printed in-line with the modified PvOH with a high alcohol content was drying nearly 3 times as fast as Comparative Coating#5.

The printed samples for Resin#1 and Coating#1 were analysed by Head Space-Gas Chromatography analysis to determine the retained solvents in the samples. The results obtained are given in mgm-2 of print and indicate that the maximum possible acetaldehyde levels available to migrate would result in <1 ppm (EU food model) for all prints at both the 40° C. and 100° C. incubation temperatures. This was well below the 6 ppm specific migration limit listed in Commission Regulation (EU) No. 10/2011.

TABLE 4

Residual Solvents in Resin#1 and Coating#1.

| Solvent | Resin#1 | Coating#1 |
|---|---|---|
| Acetaldehyde | 0.09 | 0.03 |
| Ethyl acetate | 0.01 | 0.01 |
| isopropyl acetate | 0.00 | 0.00 |
| Methylethyl ketone | 0.00 | 0.00 |
| Ethanol | 1.84 | 1.64 |
| n-propyl acetate | 0.10 | 0.05 |
| n-propanol | 0.00 | 0.00 |
| Ethoxy propanol | 0.00 | 0.00 |
| Total solvent | 2.04 | 1.73 |

Lamination bond strength of acetal modified polyvinyl alcohol Resin#1 and Coatings#1 and Comparative Coating#5. Table 5 shows that Resin#1 and Coating#1 exhibit acceptable lamination bond strength performance. In the case of Coating#1, the film destruct prevents one from obtaining the peak load and thus the bond strength is expected to be higher than the stated figure. For typical packaging applications, a bond strength of >1 is preferred, >2 is more preferred, >2.5 is most preferred. In general, a higher lamination bond strength is preferred.

TABLE 5

Lamination Bond Strength of Resin#1 and Coating#1 and Comparative Coating#5.

| Sample | Bond Strength (Adhesive Liofol) |
|---|---|
| Comparative Coating#5 | 2.80N FT (film tear) |
| Resin#1 | 4.48N FT (film tear) |
| Coating#1 | 2.48N FD (film destruct) |

All references cited herein are herein incorporated by reference in their entirety for all purposes.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the invention.

I claim:

1. An in situ method for preparing a resin solution comprising:
   (a) providing a solution comprising polyvinyl alcohol homopolymer or copolymer with ethylene groups, alcohol, and a C1-C3 aldehyde in order to achieve an acetalization of under 25 mol %; and
   (b) adjusting solids content of the solution to about 20 to about 35 wt %;
   wherein, said method does not comprise any step selected from the group consisting of: an isolation step, a washing step and a precipitation step, and the alcohol is adjusted to be at least 40 wt % and up to 60 wt %.

2. The method of claim 1, wherein the solution does not contain an aldehyde with at least 4 carbons.

3. The method of claim 1, wherein the solution comprises polyvinyl alcohol copolymer resin as a reactant.

4. A solution comprising a non-isolated, non-washed, and non-precipitated polyvinyl acetal resin comprised of acetalized polyvinyl alcohol polymer, said resin having a saponification degree of at least 90% and a degree of acetalization of less than 25 mol %, wherein the water content of the solution is less than 40 wt %.

5. The solution of claim 4, wherein the acetalized polyvinyl alcohol polymer is a homopolymer or a copolymer.

6. The solution of claim 4 having a saponification degree of at least 95%.

7. The solution of claim 4 having a saponification degree of at least 98%.

8. The solution of claim 4 having a degree of acetalization of less than 15 mol %.

9. The solution of claim 4 having a degree of acetalization of less than 10 mol %.

10. An ink or coating composition comprising a solution comprising a non-isolated, non-washed, and non-precipitated polyvinyl acetal resin comprised of acetalized polyvinyl alcohol polymer, said resin having a saponification degree of at least 90% and a degree of acetalization of less than 25 mol %, and the water content of the solution is less than 40 wt %.

11. The ink or coating composition of claim 10, further comprising a pigment.

12. An ink or coating composition comprising a solution comprising a non-isolated, non-washed, and non-precipitated polyvinyl acetal resin comprised of acetalized polyvinyl alcohol polymer, said resin having a saponification degree of at least 90% and a degree of acetalization of less than 25 mol %, wherein the water content is less than 50 wt %.

13. An ink or coating composition comprising a solution comprising more than 40 wt % lower alcohol and a non-isolated, non-washed, and non-precipitated polyvinyl acetal resin comprised of acetalized polyvinyl alcohol polymer, said resin having a saponification degree of at least 90% and a degree of acetalization of less than 25 mol %.

14. The ink or coating composition of claim, 13, comprising more than 50 wt % lower alcohol.

15. The ink or coating composition of claim 10, which is suitable for printing on a flexographic or gravure press.

16. The ink or coating composition of claim 10, which forms a gas barrier with an oxygen transmission rate of less than 10 cc m$^2$/day at <0.6 μm dry film thickness.

17. A method of making an ink or coating composition, comprising adding the solution of claim 4 during preparation of said composition.

18. A method of printing on or coating a substrate comprising printing on or coating said substrate with the ink or coating of claim 10.

19. The ink or coating composition of claim 12, further comprising a pigment.

20. The ink or coating composition of claim 13, further comprising a pigment.

* * * * *